Dec. 11, 1951     C. G. MUENCH     2,578,314
CONVEYER APPARATUS
Filed Feb. 21, 1949
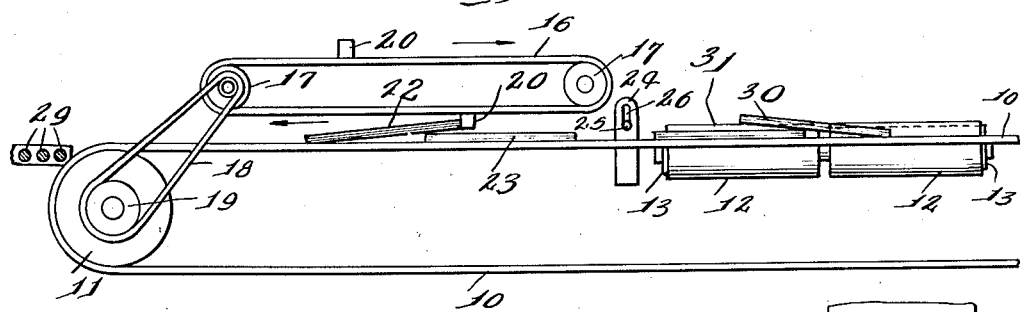
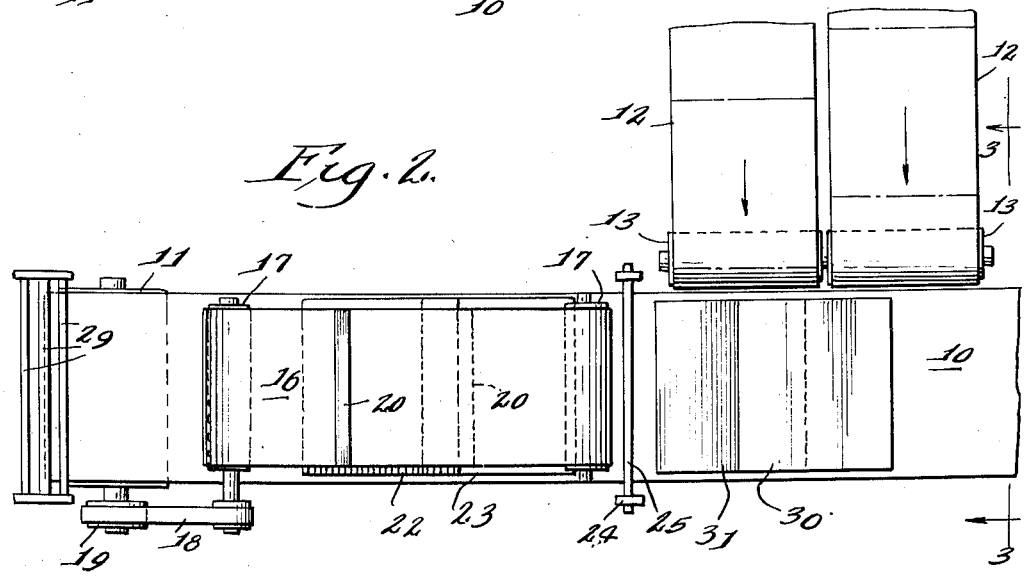
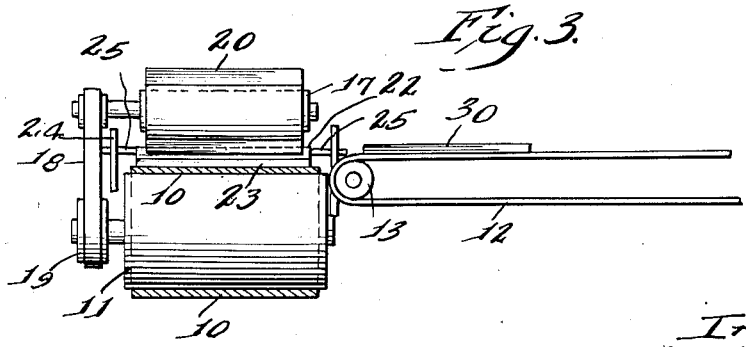
Inventor.
Carl G. Muench
By Edw. A. Hampson
Attorney.

Patented Dec. 11, 1951

2,578,314

UNITED STATES PATENT OFFICE 2,578,314

CONVEYER APPARATUS

Carl G. Muench, Glenview, Ill., assignor to The Celotex Corporation, Chicago, Ill., a corporation of Delaware Application February 21, 1949, Serial No. 77,531

5 Claims. (Cl. 198—29)

1

This invention relates to a conveyor apparatus, that is, to a combination of devices for conveying goods, in particular from one operation in manufacture to a subsequent operation or step. The apparatus hereof is particularly designed for use in connection with the conveying of sheet form material, that is, material which, with respect to its breadth and its width, is relatively thin. For example, it is particularly useful in connection with the conveying of sheets of fiber insulation board.

The invention deals in particular with a conveyor apparatus wherein sheet form or sheet-like units are supplied at two different points to a conveyor, and it deals particularly with a construction for positioning the conveyed material on the conveyor.

A particular object of the invention is to provide a conveyor apparatus which comprises, in combination, devices for positioning the conveyed articles on a conveyor, and wherein, if the articles are inadvertently placed on the conveyor one on another, or more or less overlapping, then any such are relocated so that the sheets are individually positioned on and carried by the conveyor. Other and additional objects of the invention will become apparent upon reading the following specification, and will be specifically set out and defined in the appended claims.

In the accompanying drawing, Figure 1 is a diagrammatic side elevation of a conveying system;

Figure 2 is a top plan view of the device shown in Figure 1; and

Figure 3 is a sectional view taken on line 3—3.

In the drawing there is illustrated a portion of a main conveyor 10 which passes around cylinder 11, which cylinder may, as it is readily understood, be driven by a suitable means. Main conveyor 10 may be provided to receive goods from two sources as, for example, two machines at which the sheets of material are being processed by like mechanical operations. Broadly, however, conveyor 10 may receive sheets or sheet-like material from any plurality of sources.

In the drawings there are illustrated two similar secondary conveyors 12 provided for carrying to main conveyor 10 like or more or less similar sheet form goods. These secondary conveyors 12 are driven by any suitable means, either by suitable means driving cylinders 13 over which they are trained, or by suitable means driving like cylinders over which conveyors 12 pass at their other ends. It is to be understood that conveyors 12 are merely representative of conventional means for supplying the sheet form material and discharging such to main conveyor 10.

Assume, for the purpose of explanation, that each of conveyors 12 are carrying sheet form products having dimensions of 12 inches by 12 inches and a thickness of 1 inch, which sheets will hereinafter be referred to as tile, as a convenient example of the material which may be handled by the device. These tile may be assumed to be supplied to secondary conveyors 12 more or less uniformly and more or less in unison, or they may be supplied relatively intermittently as they merely represent, as mentioned, a convenient means for conveying the tile material to the conveyor 10.

Conveyor 11 may or may not operate at a speed substantially or somewhat more than double the speed of the secondary conveyors 12, since this will depend largely upon the rate at which the tile are delivered by secondary conveyors 12 to conveyor 10. It will be assumed that conveyor 10 is run at such speed relative to conveyors 12 that conveyor 10 will receive the tile from conveyors 12, with conveyor 10 operating at such speed that the tiles, which are supplied from conveyors 12, may be carried individually and more or less separated on conveyor 10.

If, due to some variation of operation, the tiles which are being supplied to conveyors 12 are not properly spaced, or if they are supplied slightly out of unison, then it is probable that these conveyors, in discharging the tile to conveyor 10, will cause such tile to be discharged so that they are received on conveyor 10 in more or less overlapping relation. While it would be possible, of course, by close control of the speeds of the conveyors 10 and 12, the supply of tile to conveyors 12 and the spacing of tile thereon, to always discharge the tile from conveyors 12 to conveyor 10 individually, and not in overlapping relation, such would be relatively difficult and would require accurate coordination of the various parts. All such difficulties are avoided by the inventions hereof.

There is provided over conveyor 10 an endless belt 16 which is carried by suitably journaled belt rolls 17—17, one of which may be driven as by means of belt 18 mounted to a pulley 19 on conveyor roll 11. This endless belt 16 is mounted directly over conveyor 10 substantially parallel thereto and spaced therefrom, the spacing between the belt and the conveyor being determined by the material being handled, but generally if such is sheet form material, the spacing will preferably be about four times the thickness of the sheet material, this being the dimension between the lower run of the belt and the surface of the conveyor.

On conveyor belt 16 there are mounted cleats 20 which may conveniently be hardwood strips, or other suitable material. These strips extend across the width of the belt and are of such height that when the device is operating the lower surface of such cleat 20, when on the lower run of the belt, will clear the upper surface of a tile on the conveyor by less than the thickness of a tile. Again attention is directed to the fact, in referring to a tile, that such is merely used as representative of a sheet of material being conveyed.

The length of endless belt 16 is not at all critical, but the distance between its belt rolls 17—17 should be sufficient, which ordinarily will be a distance of somewhat in excess of twice the length of tile being handled, for which length a dimension of three times the length of a tile being handled is a convenient figure. Endless belt 16 should operate at slightly over twice the speed of the conveyor 10. If tile being discharged from conveyors 12 are discharged one upon another more or less, as is shown in Figure 1 of the drawing, then from the foregoing it will be obvious that a cleat 20 will contact a rear edge of overlying tile 22 which, with respect to the direction of travel of conveyor 10, is rearwardly and upwardly directed resting on tile 23. Due to the speed of the endless belt 16, which is traveling faster than conveyor 10, it is obvious that cleat 20 will move the overlying tile forwardly to advance tile 22 on conveyor 10 until its rear edge clears the forward edge of underlying tile 23. At this point the rear edge of the formerly overlying tile, numeral 22, will drop onto the conveyor under the influence of gravity and thus will be discharged from the effect of cleat 20, and the desired result will have been accomplished. That is, the overlying tile 22 will have been moved off the underlying tile 23, and the tiles are properly lined up on conveyor 10 to be conveyed and discharged therefrom to roller conveyor, which is indicated by numeral 29.

Tile discharge to conveyor 10, instead of being in the arrangement as illustrated by tile 22—23, may be as shown at 30 and 31, where 30 is an overlying tile resting on an underlying tile 31, so that therefore tile 30, with respect to the direction of travel of conveyor 10, is forwardly and upwardly directed. It will be obvious that cleats 20 on belt 16 will not be effective to correct the situation which is illustrated by tiles 30 and 31, so therefore there is provided a device for this purpose which comprises mounting or support members 24, one of which is provided on each side of conveyor 10 and each of which has a slot 26 therein in which rod 25 is mounted. The slot 26 in support 24 is so placed that rod 25, under the influence of gravity, resting at the bottom of such slot, will just clear tile 31 on conveyor 10 and thus such rod 25 will contact the forward end of inclined tile 30 and retard the forward travel thereof until the rear end of tile 31 has moved forwardly from under the front edge of tile 30, whereupon tile 30, under the influence of gravity, will drop down flat on conveyor 10. It is obvious, when tile 30 drops down flat on conveyor 10, as above referred to, that rod 25 will no longer retard the forward movement of tile 30, and that it will move forwardly on the conveyor. It is to be noted that the slot 26 in which rod 25 is mounted provides for a limited movement vertically upward of rod 25, so that as tile which happened to be in the relationship of tiles 22 and 23 approach such rod 25, the rod may ride upwardly on the upper inclined surface of tile 22, and thus such combination of tile may freely pass the intercepting rod member 25 to be acted upon by cleat 20 of endless belt 16, as heretofore referred to.

From the foregoing description it is to be understood that the combination of devices above described effectively function to rearrange overlapping tile on conveyor 10, and that this arrangement of apparatus takes care of both of the conditions wherein an overlying tile is either, with respect to the direction of travel of the conveyor, supported upon an underlying tile inclined rearwardly and upwardly or forwardly and upwardly, or should the condition be where the upper tile is lying flat on the under tile, then the rod member 25 will take care of this condition since it will intercept the forward edge of the overlying tile to retard its forward movement until the underlying tile clears the forward edge of the overlying tile.

The apparatus hereof is, of course, subject to many modifications, as for example, it is not at all necessary that the tile be delivered to conveyor 10 by conveyors 12. They may, for example, be directly discharged from machines by gravity, or the tile might even be placed on the conveyor by hand. In any case, the overlying spaced endless belt will, by the action of the cleats mounted thereon, remedy any condition wherein the tile as placed on conveyor 10 are in overlapping relation. Various types of conveyors, of course, may be employed, and it is to be understood that the specific description of the device is merely for the purpose of disclosing the invention to those skilled in the art, and that the specific description is of means by which the inventions hereof may be exercised.

The device hereof and its operation having been disclosed in detail, I claim:

1. In combination with a belt conveyor carrying substantially similar flat board form units thereon, means along the length thereof causing displacement of any such unit overlying or partially overlying another such unit and comprising means mounting a rod form member across the conveyor, spaced therefrom a distance sufficient to clear a unit lying flat on the conveyor but allowing an upward or rising movement of the rod away from the conveyor and beyond such rodlike member an endless driver means mounted over the conveyor, a portion thereof running substantially parallel to but spaced from the conveyor, a cleat extending transverse to the conveyor carried by the endless driver means, the lowermost portion of such cleat spaced from the surface of the conveyor spaced therefrom a distance sufficient to clear a unit lying flat on the conveyor and means driving the endless driven means at a speed slightly in excess of the speed of the conveyor.

2. In a conveying apparatus, in combination, a substantially horizontally running belt conveyor receiving a plurality of substantially like sheet form articles, a plurality of supply conveyors discharging such articles to the receiving conveyor, a rod form member mounted above, extending across the receiving conveyor and spaced therefrom, support means supporting the rod and including stop means limiting downward movement of the rod member toward the receiving conveyor but providing permissible upward movement thereof away from the conveyor, and endless driven means mounted over the receiving conveyor, substantially parallel thereto but spaced therefrom, cleats carried by said endless means and driving means driving the endless means at a lineal speed in excess of the lineal speed of the receiving conveyor.

3. Conveying apparatus comprising in combination, an article receiving conveyor, means discharging articles to the receiving conveyor, a vertically displaceable bar mounted over the receiving conveyor, an endless conveyor mounted over the receiving conveyor, lugs carried by the endless conveyor and means driving the endless conveyor at a linear rate of speed in excess of the linear rate of speed of the receiving conveyor.

4. In combination with a belt conveyor, support means adjacent thereto, a rod mounted to the support means and positioned over the conveyor, extending transversely thereto and spaced therefrom a distance substantially the thickness of the material to be conveyed, the support means comprising a stop determining the lowermost position of the rod mounted thereto, a substantially vertical slot receiving the rod ends and providing a loose connection between the supports and the rod mounted thereto.

5. In combination with a belt conveyor conveying substantially identical sheet form units, means positioned thereover and intercepting the forward edge of any unit on the conveyor positioned thereon relative its direction of travel in an upward and forwardly inclined position, and spaced therefrom relative the direction of travel of the conveyor a second means mounted to advance in the direction of travel of the conveyor and moving in a path substantially parallel to the conveyor and just clear of a unit lying flat on the conveyor, whereby it will clear a unit lying flat but will contact the rearward edge of a unit positioned on the conveyor inclined thereto in a rearward and upward direction relative the direction of travel of the conveyor.

CARL G. MUENCH.

REFERENCES CITED

The following references are of record in the file of this patent:

UNITED STATES PATENTS

| Number | Name | Date |
| --- | --- | --- |
| 505,948 | Lubking | Oct. 3, 1893 |
| 528,095 | Hisey | Oct. 23, 1894 |
| 614,392 | Jacobs | Nov. 15, 1898 |
| 1,416,763 | Thom | May 23, 1922 |
| 1,883,078 | Stretch | Oct. 18, 1932 |
| 2,307,415 | Malhiot | Jan. 5, 1943 |